United States Patent [19]
Jenkins et al.

[11] 3,906,963
[45] Sept. 23, 1975

[54] DENTAL FLOSS APPLICATOR

[75] Inventors: Richard A. Jenkins, Indianapolis; Jennifer J. Trueblood, now by change of name Jennifer Jean Hays, South Bend, both of Ind.

[73] Assignee: Jen Tru Inc., Indianapolis, Ind.

[22] Filed: Oct. 18, 1973

[21] Appl. No.: 407,430

[52] U.S. Cl............. 132/92 A; 132/92 R; 132/91
[51] Int. Cl.²......................................... A61C 15/00
[58] Field of Search............ 132/92 A, 92 R, 90, 91, 132/89

[56] References Cited
UNITED STATES PATENTS

| | | | |
|---|---|---|---|
| 924,543 | 6/1909 | Dysart | 132/92 A |
| 1,110,680 | 9/1914 | Gamble | 132/92 A |
| 1,217,779 | 2/1917 | Kleckner | 132/92 A |
| 1,279,026 | 9/1918 | Sievers | 132/92 R |
| 2,117,844 | 5/1938 | Grieco | 132/92 R |
| 2,146,375 | 2/1939 | Landis | 132/92 R |
| 2,376,750 | 5/1945 | Bell | 132/92 R |
| 3,631,869 | 7/1972 | Espinosa | 132/91 |

*Primary Examiner*—G. E. McNeill
*Attorney, Agent, or Firm*—Woodard, Weikart, Emhardt & Naughton

[57] ABSTRACT

This invention relates to a dental floss holder-applicator which has a spring tension on the floss at the point of application. New dental floss may be intermittently fed from a spool rotatably mounted in the handle of said holder. Means are provided for automatically adjusting the amount of dental floss extending between the tips of two prongs such that the dental floss suspended between the prongs may be conveniently and efficiently applied to interdental surfaces.

31 Claims, 7 Drawing Figures

DENTAL FLOSS APPLICATOR

BACKGROUND OF THE INVENTION

1. Field of the Invention

This invention relates to a dental floss applicator for supplying dental floss to an interdental point of application.

2. Description of the Prior Art

The concept of using dental floss to clean and condition interdental surfaces is not new. However, previous attempts to manually apply dental floss, i.e. by use of the subject's fingers, have resulted in serious sanitary problems as well as severe limitations in terms of the user's manual dexterity. As a result of the acknowledged advantages of dental floss use and the fact that it must be applied to hard-to-reach surfaces, there arose a need for a suitable applicator. The requirements for an effective dental floss dispenser-applicator are that it must contain a unit of dental floss, must fit into a patient's mouth and must be so manipulable as to reach small corners and recesses of a person's mouth. Previous attempts to construct an adequate dental floss applicator have resulted in devices all suffering from serious deficiencies. The most serious of these deficiencies is the inability to provide an adequate amount of tension control at the point of floss application. This has resulted in floss application being either too loose so as to be unmanageable while in the mouth or too tight so as to cause unnecessary abrasion of gums and other soft surfaces found in the mouth. An additional deficiency in previous attempts to formulate a dental floss applicator is the inability of previous applicators to conform the dental floss to the elliptical or C shape of a tooth. This conformation is necessary to clean the entire tooth rather than just a single surface point of contact. These and other deficiencies found in previous attempts to manufacture floss applicators are thought to result from a lack of tension control of floss at the point of application in addition to an inability to adjust the width of the applicator to conform to the width of the specific tooth or type of tooth being cleaned. Sample patents teaching dental floss holders and dispensers are U.S. Pat. No. 2,707,782 issued to Eby in 1955 and U.S. Pat. No. 2,917,844 issued to Grieco in 1937.

U.S. Pat. No. 2,381,530 to J. E. Dembenski discloses a dental floss holder which incorporates springs in each prong of the holder. These springs are used to compensate for changes in the length of the floss from the supply spool to the takeup spool as new floss is advanced to the position of the used floss.

SUMMARY OF THE INVENTION

A dental floss holder-applicator is designed to provide an instrument which will enable the user, whether private or professional, to properly floss his own teeth, the teeth of a patient, or retarded or handicapped individuals. The floss holder-applicator (hereinafter referred to as the flosser) is designed to make flossing easier, less bothersome, and, therefore, more convenient and more likely to get done. The net results of this will be an improvement in dental hygiene.

The flosser is designed to permit flossing in a manner which is prescribed by technicians in the field of preventive dentistry. A spring tensioned flosser allows the dental floss to form a C shape around the tooth during flossing. This prescribed manner of flossing is not available with other floss holders which hold the floss very taut at the point of contact with the tooth. This results in the dental floss cleaning only a small portion of the interdental surface as opposed to applicant's flosser which can completely clean the tooth.

Therefore, the flosser of this invention is designed to provide a continuous feed of fresh floss from a rotatably mounted spool of floss in addition to providing the necessary tension flexibility to allow the formation of a C-shape to provide more efficient cleaning of teeth and gums. An additional advantage of the flosser of this invention is the adjustable width of the prongs. This allows an exact fit for each type and shape of tooth. More specifically, when forming the preferred C-shhape, it is more desirable to form said C-shape in as tight a semi-circle as is possible to facilitate the most complete cleaning of the interdental surface. Without an adjustable member such as the adjustable prong assembly of applicant's invention, this is not possible. Therefore, the spring tension member works in a cooperative relationship with the width adjusting member to allow the maximum efficiency possible in the cleaning of interdental surfaces.

Therefore, it is an object of this invention to provide a flossing instrument having a variable, spring actuated tension in the dental floss at the point of application to the interdental surfaces.

It is a further object of this invention to provide a flossing device with an adjustable width at the point of contact with interdental surfaces.

A still further object of this invention is to provide a dental flossing device which is conveniently manipulated in the close quarters of the mouth.

These and other objects of the above invention will be apparent from the following description of the drawings and preferred embodiment of the invention.

BRIEF DESCRIPTION OF THE DRAWINGS

The full nature of the invention will be understood from the accompanying drawing and the following description and claims.

DESCRIPTION OF THE PREFERRED EMBODIMENT

Figure 1:
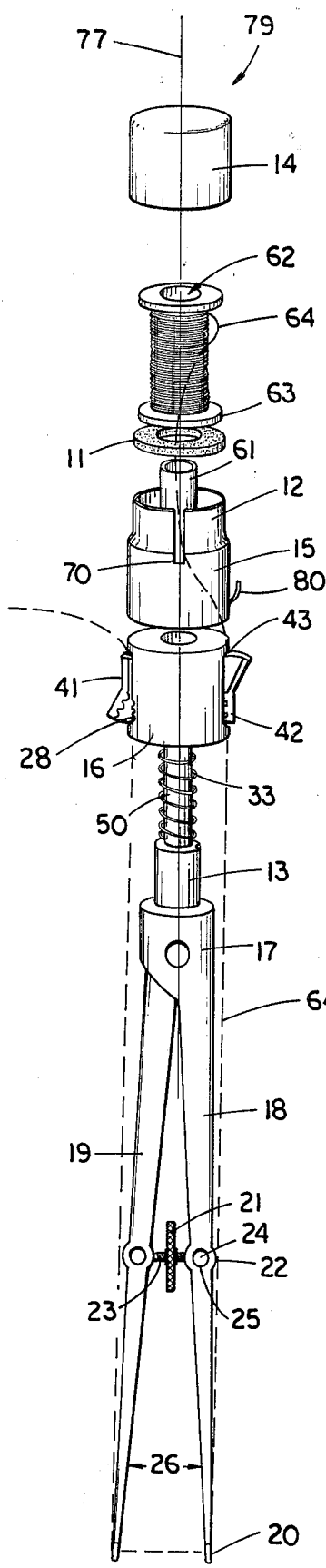
FIG. 1 is a front elevation of the cooperating elements in disassembled relationship.
Figure 2:
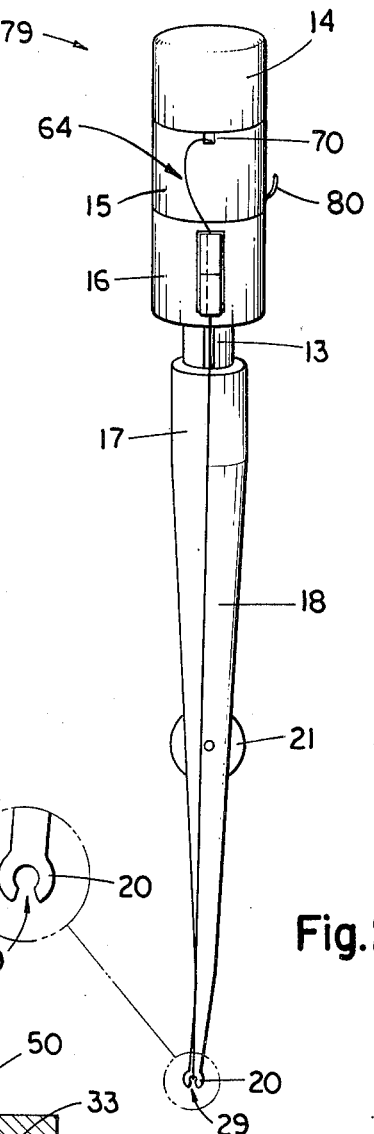
FIG. 2 is a side elevation of the assembled flossing device.
Figure 3:
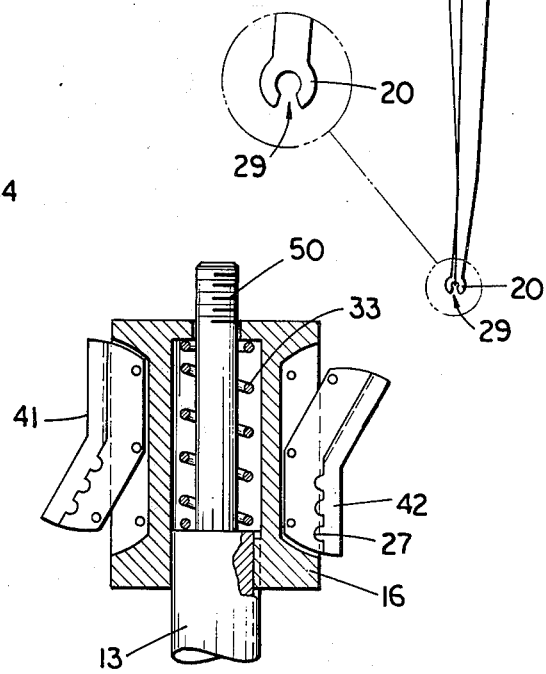
FIG. 3 is an enlarged vertical section taken through a portion of the structure of FIG. 2.

For the purposes of promoting an understanding of the principles of the invention, reference will now be made to the embodiment illustrated in the drawing and specific language will be used to describe the same. It will, nevertheless, be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a prong assembly 17 which has a stationary prong 18 which is stationary along the longitudinal axis of the assembled structure 79 and a movable prong 19 which is movable away from the longitudinal axis 77 of the assembled device. Movement of movable prong 19 is regulated by width adjustment screw 23. Width adjustment screw 23 is, in turn, conveniently rotated by width adjustment knob 21. To prevent unnecessary stress on width adjustment screw 23, movable pins 24 are placed in pin eyelet 25 to receive the respective oppositely threaded ends of screw 23. This allows movable prong 19 to be adjusted to various widths without placing an unnecessary strain on said screw as the angle 26 between prongs 18 and 19 becomes more severe. Prong floss eyelets 20 are provided at the tip of prong assembly 17 for guiding and holding the dental floss at the point of application to interdental surfaces. Optionally, eyelets 20 are provided with slots 29 to permit ease of threading.

Prong assembly 17 is rigidly connected to a shaft 13. Once the dental floss is in the desired position, tension is maintained by hidden spring 33. Hidden spring 33 is hidden by securing means housing 16. Securing means housing 16 contains two independently operated securing means each of said securing means having an open and closed position. Preferred securing means are manually operated toggle switches. For purposes of illustration, toggle switch 42 is shown in the drawing in the closed position and toggle switch 41 in the open position. Toggle switches 41 and 42 each have a securing device pathway 43 which passes between the toggle switch and the securing means housing 16. In the preferred embodiment, the toggle switches 41 and 42 are provided with an inner serrated surface 27 so as to intermesh with a corresponding serrated surface 28 on the outside of securing means housing 16. Said corresponding serrated surface causes an extreme compression force on the dental floss when the toggle switch is in the closed position. This force will hold the floss in a fixed position under normal use of the flosser.

Sponge material 11 is provided between spool container 15 and dental floss spool 63. Spool container 15 and spool cover 14 fit together with the indented surface 12 of spool container 15 in a pressure sealing relationship with spool cover cap 14. Dental floss 64 is wrapped or purchased in unit quantities on dental floss spool 63 which contains spool hole 62. Spool mount 61 which forms a rigid member of spool container 15 and which is smooth is rotatably received into spool hole 62. Dental floss 64 is then fed out through spool floss slot 70 and fed into securing device pathway 43 and into stationary prong 18, floss eyelet 20, across to movable prong 19 and through corresponding prong floss eyelet 20 on movable prong 19, and finally through the opposite securing device pathway 43.

Threaded screw 50 extends in threaded relationship into prong assembly 17, shaft 13, and spool container 15. Said threaded spool 50 holds the members of the dental floss holder in a fixed cooperating relationship.

It can be seen that some of the advantages which are characteristic of the flossing device of this invention are the fact that there is a spring tension on the floss which allows the floss to form a desirable C-shape around a tooth during the actual flossing operation. This C-shape is not otherwise available where floss is held very tightly between prongs or other suitable holding devices. In addition, the floss length between eyelets 20 can be varied according to the size and shape of the specific interdental surface to be flossed.

Optionally, a recessed groove can be provided along prongs 18, 19 and in prong eyelets 20. These recessed grooves can allow the dental floss prior to entering prong eyelets 20 to be enclosed within the actual prongs 18 and 19. This provides additional operating convenience when the flosser is actually in the mouth by reducing the chance of contact between the floss and the user's hands. While in the grooves, the dental floss is not exposed to rough edges and other objects that might normally catch the exposed floss. Also, optionally, the eyelets 20 are provided with slots 29 to permit ease in threading.

The convenient separation of the prong assembly 17 from shaft 13 and the remaining portion of the flosser enables the user to purchase several prong assemblies for use with only one shaft 13 and other portion. Since it is normally only the prongs that come in contact with the patient's mouth a serious sanitary problem could arise if the prongs were not sanitized between each use. Interchangeability of prong assemblies enables the user to have several prong assemblies and thus use each only once prior to cleaning and/or sterilization. This is, of course, of paramount importance to a professional person who would clean many sets of teeth per day.

The dental floss holder applicator of this invention can be constructed using a nickel plated steel body and shaft with a plastic toggle switch assembly, or, for home use, it may be constructed entirely of plastic and reinforced plastic, with the exception of the spring. Other combinations of plastic and steel such as a plastic prong assembly with a metal cap assembly can also be used.

When the floss being used becomes soiled or frayed, the toggle switches are pressed to the open position to allow new floss to be pulled through the instrument from the continuous spool, mounted behind switch assembly on a threaded shaft. Only about one-half inch to three-fourth inch of new floss need be pulled through to provide clean floss at the end of the prongs, thus saving wasted floss normally encountered when using fingers to floss or when using a taut "sling shot" type floss holder. When the new floss is pulled into position, a squeeze on the opposite securing devices such as toggle switches will securely lock the floss in place for further flossing. Greater tension can be obtained by locking one of the securing devices first, then pulling on the unlocked floss until the desired tension is obtained, and then locking the remaining securing device.

Replacement spools of unwaxed floss are already currently available at drug stores which carry a representative line of dental products. The spools are replaced simply by separating the spool floss cover members, inserting the new spool, and replacing the cap. A cut-off edge 80 for used floss is incorporated as a part of securing device housing 16 in the base of the spool holder.

The entire toggle assembly, shaft, spring, and spool holder can be easily separated from the pronged end of the instrument by screwing the entire assembly in one piece at the base of the shaft. This allows sterilization of the pronged end, the end that goes into the mouth, by either autoclave or chemical sterilization processes. This also allows the purchaser to buy several prong assemblies with just one spool holder assembly, permitting quick transfer from patient to patient or from user by having presterilized prong assemblies.

Figure 4:
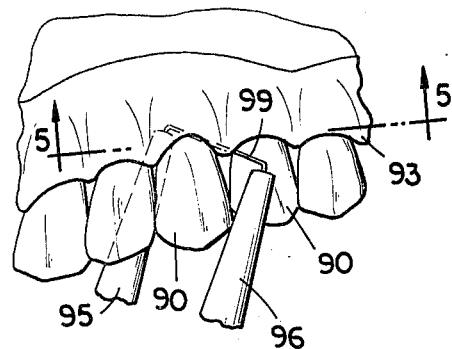
FIG. 4 illustrates the end of a prior art flosser positioned to floss between teeth.
Figure 5:
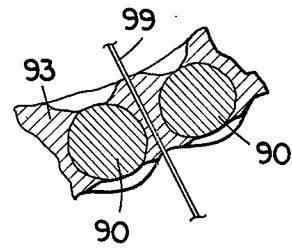
FIG. 5 is a section of the flosser and teeth of FIG. 4 and illustrates generally the floss path obtained with prior art flossers.

Referring in particular to FIG. 4, there are illustrated teeth 90 being flossed with a device of the prior art. Because the floss 99 is tightly and inextensibly stretched between the prongs 95 and 96 of the flosser, the floss 99 assumes a straight line configuration. FIG. 5 is representative of a cross section of FIG. 4 taken along the line 5—5 and viewed in the direction of the arrows.

Figure 6:
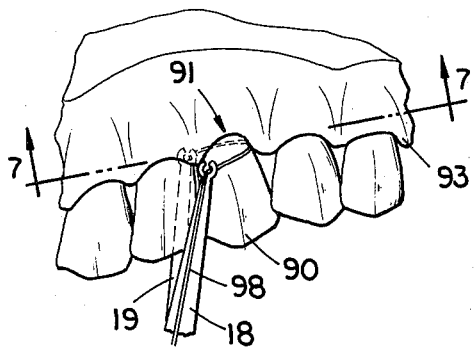
FIG. 6 illustrates the end of the flosser of this invention positioned to floss between teeth.
Figure 7:
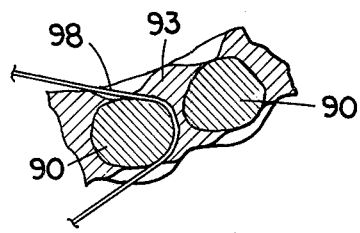
FIG. 7 is a section of the flosser and teeth of FIG. 6 and illustrates generally the floss path obtained with the flosser of this invention.

Referring to FIG. 6, there are illustrated teeth 90 being flossed with the flosser of this invention. Because the flosser of this invention can be adjusted to have the distal ends of its prongs 18 and 19 just slightly larger than the individual tooth width and because a significant amount of additional floss can be provided at relatively constant tension between the distal ends of prongs 18 and 19, the floss 98 easily can assume a C-shape around a tooth 90. FIG. 7 is representative of a cross section of FIG. 4 along the line 7—7 and viewed in the direction of the arrows.

With the flosser of this invention, when floss is positioned to first touch the tooth at point 91, the floss can assume a C-shape well below the gums 93, in the space between tooth 90 and gums 93. If an attempt were made to use a prior art flosser to clean this portion of a tooth, injury to the gums would inevitably result because of the inability of prior art flossers to provide the needed C-shape of a relatively constant tension.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A dental floss applicator comprising:
   a. a prong assembly including
      1. a first prong having a distal end which includes means for guiding dental floss,
      2. a second prong having a distal end which includes means for guiding dental floss,
      3. width maintaining means connecting to said first prong and said second prong for maintaining any one of several fixed distances between the distal end of said first prong and the distal end of said second prong, said width maintaining means having an adjusting means for permitting the fixed distance maintained by said width maintaining means to be readily changed to another of the several fixed distances, and
   b. floss tension and supply means connecting to said prong assembly for continuously applying tension to floss guided between the distal end of said first prong and the distal end of said second prong and for automatically providing a temporary increase of at least 20% in length of floss between the distal end of said first prong and the distal end of said second prong while force is applied to the floss.

2. The dental floss applicator of claim 1 wherein said first prong and said second prong are joined at their respective proximal ends.

3. The dental floss applicator of claim 1 wherein each of said means for guiding dental floss comprises an eyelet having a slot communicating with the exterior of said eyelet.

4. The dental floss applicator of claim 1 in which said width maintaining means includes a width adjustment screw connecting said first prong to said second prong.

5. The dental floss applicator of claim 4 which includes in each of said prongs, a threaded movable pin, and in which said width adjustment screw is received by said threaded movable pins.

6. The dental floss applicator of claim 1 wherein said floss tension and supply means includes switches.

7. The dental floss applicator of claim 6 wherein said switches are manually operated toggle switches.

8. The dental floss applicator of claim 7 wherein said floss tension and supply means has a floss pathway.

9. The dental floss applicator of claim 7 wherein said manually operated toggle switches have a serrated edge.

10. The dental floss applicator of claim 1 which additionally includes dental floss guided from said floss tension and supply means to the distal end of said first prong, and then to the distal end of said second prong, and then back to said floss tension and supply means.

11. The dental floss applicator of claim 10 which additionally includes a spool of floss and means for rotatably connecting said spool to said floss tension and supply means.

12. The dental floss applicator of claim 11 which additionally includes a cylindrically shaped spool container connected to said floss tension and supply means.

13. The dental floss applicator of claim 12 in which said spool container has a spool floss on its side.

14. The dental floss applicator of claim 13 which additionally includes sponge material within said spool container and a spool cover engaging said spool container.

15. A dental floss applicator comprising:
   a. a prong assembly including
      1. a first prong having a distal end which includes means for guiding dental floss and
      2. a second prong having a distal end which includes means for guiding dental floss and
      3. connecting means connecting said first prong and said second prong
   b. floss tension and supply means connecting to said prong assembly for continuously applying tension to floss guided between the distal end of said first prong and the distal end of said second prong, said floss tension and supply means including:
      1. a housing,
      2. floss securing means on said housing for securely connecting floss directly to said housing and
      3. means connecting said housing to said prong assembly for permitting displacement of said housing relative to said connecting means of said prong assembly only when force is applied to said housing.

16. The dental floss applicator of claim 15 in which said floss securing means includes two clamping devices.

17. The dental floss applicator of claim 16 in which said clamping devices are in the form of toggle switches.

18. The dental floss applicator of claim 15 which additionally includes dental floss guided from said floss securing means to the distal end of said first prong, and then to the distal end of said second prong, and then back to said floss securing means.

19. The dental floss applicator of claim 18 which additionally includes width adjusting means connecting to said first prong and said second prong for adjusting the distance between the distal end of said first prong and the distal end of said second prong.

20. The dental floss applicator of claim 15 in which the connecting means comprises said first prong and said second prong being joined at their respective proximal ends.

21. The dental floss applicator of claim 15 which includes a width adjustment screw connecting said first prong to said second prong.

22. The dental floss applicator of claim 21 which includes in each of said prongs, a threaded movable pin, and in which said width adjustment screw is received by said threaded movable pins.

23. The dental floss applicator of claim 22 which includes a manually operable toggle switch.

24. The dental floss applicator of claim 18 which additionally includes a spool of floss and means for rotatably connecting said spool to said housing.

25. A dental floss applicator comprising:
   a. a prong assembly including
      1. a first prong having a distal end which includes means for guiding dental floss,
      2. a second prong having a distal end which includes means for guiding dental floss and
      3. width maintaining means connecting to said first prong and said second prong for maintaining any one of a several of fixed distances between the distal end of said first prong and the distal end of said second prong, said width maintaining means having an adjusting means for permitting the fixed distance maintained by said width maintaining means to be readily changed to another of the several fixed distances and
   b. floss tension and supply means connecting to said prong assembly for automatically and continuously applying, essentially independently of adjustment of said width maintaining means, a relatively constant amount of tension to floss guided between the distal end of said first prong and the distal end of said second prong, whereby the adjustment of the width maintaining means does not substantially change the amount of floss tension.

26. The dental floss applicator of claim 25 which additionally includes dental floss guided from said floss tension and supply means to the distal end of said first prong, and then to the distal end of said second prong, and then back to said floss tension and supply means.

27. The dental floss applicator of claim 25 wherein said first prong and said second prong are joined at their respective proximal ends.

28. The dental floss applicator of claim 27 which said width maintaining means includes a width adjustment screw connecting said first prong to said second prong.

29. The dental floss applicator of claim 28 which includes in each of said prongs, a threaded movable pin, and in which said width adjustment screw is received by said threaded movable pins.

30. The dental floss applicator of claim 29 which additionally includes dental floss guided from said floss tension and supply means to the distal end of said first prong, and then to the distal end of said second prong, and then back to said floss tension and supply means.

31. A dental floss applicator comprising:
   a. a first prong having a distal end which includes means for guiding dental floss,
   b. a second prong joined to said first prong and including means for guiding dental floss
   c. width maintaining means connecting to said first prong and said second prong for maintaining any one of a several of fixed distances between the distal end of said first prong and the distal end of said second prong, said width maintaining means having an adjusting means for permitting the fixed distance maintained by said width maintaining means to be readily changed to another of the several fixed distances and
   d. floss tension and supply means connecting to said first prong for continuously applying tension to floss guided between the distal end of said first prong and the distal end of said second prong,
   said floss tension and supply means including:
      1. a housing,
      2. floss securing means on said housing for securely connecting floss directly to said housing and
      3. spring means connecting said housing to said prongs for permitting displacement of said housing toward said prongs only when force is applied to said housing.

* * * * *